United States Patent [19]

Roberts

[11] 4,380,127

[45] Apr. 19, 1983

[54] DEHYDRATOR APPARATUS WITH UNIDIRECTIONAL AIR FLOW CONTROL MEANS

[76] Inventor: Elliott D. Roberts, 105 W. Shore Dr., Richardson, Tex. 75080

[21] Appl. No.: 238,848

[22] Filed: Feb. 27, 1981

Related U.S. Application Data

[63] Continuation-in-part of Ser. No. 77,900, Sep. 24, 1978.

[51] Int. Cl.³ .............................................. F26B 9/00
[52] U.S. Cl. ..................................... 34/197; 34/211;
34/237; 99/483; 99/516; 219/370; 239/558
[58] Field of Search ................ 34/195, 197, 211, 237;
126/9 R, 25 B, 25 R; 99/483, 516; 219/369,
366, 347, 370, 400; 239/552, 553.3, 558, 568,
560, 561

[56] References Cited

U.S. PATENT DOCUMENTS

| | | | |
|---|---|---|---|
| 221,445 | 11/1879 | Chase | 34/238 |
| 486,137 | 11/1892 | Taylor | 34/238 |
| 507,846 | 10/1893 | Richmond . | |
| 1,216,442 | 2/1917 | Haley . | |
| 1,287,145 | 12/1918 | Vernon | 34/238 |
| 1,511,246 | 10/1924 | Van Daam | 239/558 |
| 1,633,801 | 6/1927 | Williams . | |
| 2,017,728 | 10/1935 | Oskamp . | |
| 2,396,455 | 3/1946 | Booth . | |
| 2,408,286 | 9/1946 | Aufiero . | |
| 3,359,644 | 12/1967 | Goldman . | |
| 3,399,680 | 9/1968 | Egri . | |
| 3,868,943 | 3/1975 | Hottenroth et al. . | |
| 3,932,946 | 1/1976 | Johnson . | |
| 3,974,821 | 8/1976 | Storandt . | |
| 4,052,589 | 10/1977 | Wyatt . | |
| 4,065,857 | 1/1978 | Nelson et al. . | |

FOREIGN PATENT DOCUMENTS 616434 10/1926 France .

*Primary Examiner*—Larry I. Schwartz
*Attorney, Agent, or Firm*—Hubbard, Thurman, Turner & Tucker

[57] ABSTRACT

A dehydrator apparatus for foodstuffs and the like comprising a generally cylindrical tubular housing having a motor driven fan disposed generally centrally therein and above a base wall portion. A plurality of air inlet flow channels are provided in the base of the housing opening into the interior generally around and adjacent to the fan to provide for inlet air flow generally over the fan motor. A plurality of vertically stackable nested food drying trays are adapted to mount on the top of the housing, each tray being provided with a foraminous food supporting shelf having a substantial number of openings arranged in radially spaced apart annular rows. The openings are generally rectangular in shape and are convergent in the intended direction of air flow to minimize recirculation or flow in a direction opposite to the intended vertically upward flow direction thereby enhancing the drying or dehydrating performance of the apparatus.

17 Claims, 7 Drawing Figures

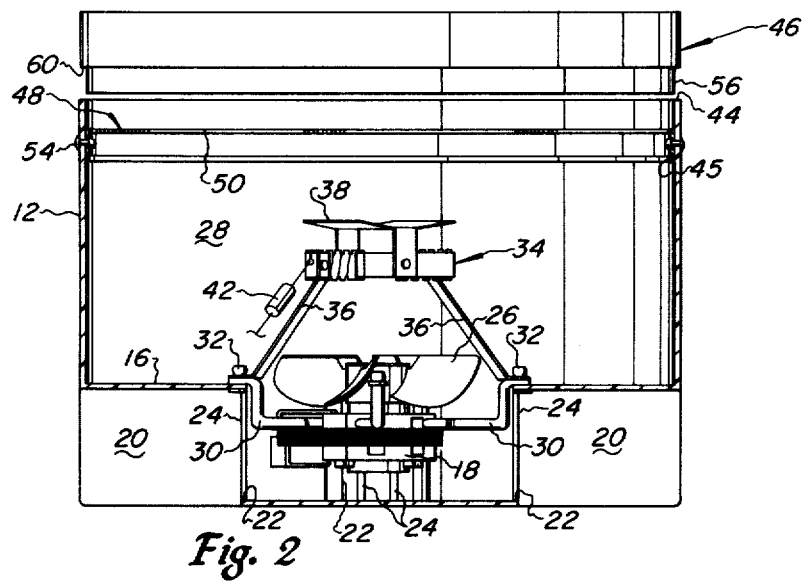
Fig. 2
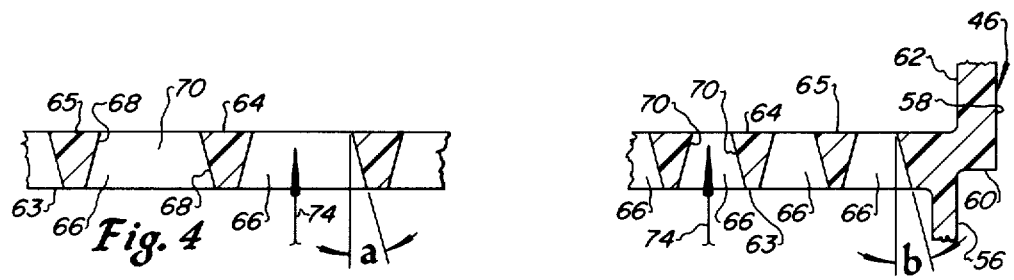
Fig. 4
Fig. 5
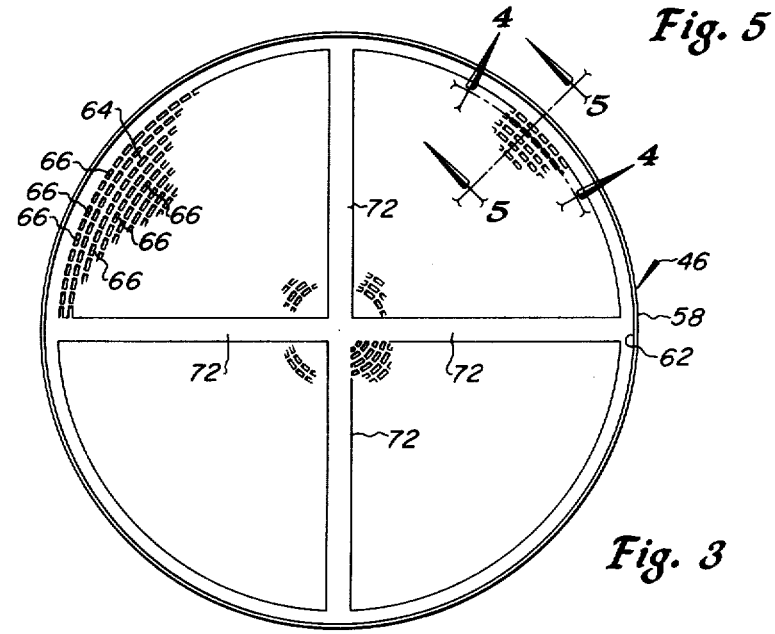
Fig. 3

DEHYDRATOR APPARATUS WITH UNIDIRECTIONAL AIR FLOW CONTROL MEANS

CROSS REFERENCE TO RELATED APPLICATION

This is a continuation-in-part of my prior co-pending application Ser. No. 077,900 filed Sept. 24, 1978.

BACKGROUND OF THE INVENTION

1. Field of the Invention

This invention pertains to a dehydrator apparatus for drying foodstuffs and the like having a plurality of vertically stacked food supporting trays or screens which provide for directing forced air flow through the dehydrator in an improved manner with minimal recirculation and reduced resistance to flow.

2. Background Art

This invention relates to dehydrator apparatus of the general type disclosed and claimed in my prior co-pending application identified hereinabove. The dehydrator apparatus described in application Ser. No. 077,900 comprises a cylindrical lightweight housing in which is disposed an electric motor driving a fan for circulating air through a plurality of vertically stacked cylindrical trays or screens mounted above the fan wherein heated air is circulated over and around foodstuffs supported by the trays to provide for dehydration of the food for storage and preservation. The present invention pertains to significant improvements in the apparatus disclosed in the abovementioned patent application which make said apparatus more efficient in operation and improves the dehydration process whereby foodstuffs treated by the apparatus may be kept for relatively long periods of time with no additional preservative treatment necessary.

In the art of dehydrator apparatus of the type which is suitable for use in the typical home kitchen it is important that an efficient, lightweight and low cost device be provided which is each to use and has the desired attributes of a home appliance. Although the present invention may be adapted to use on large scale commercial dehydrators or the like it is particularly adapted for the typical domestic kitchen.

An important consideration in providing an appliance which is suited for use in a typical domestic kitchen is that it use as little energy as possible and yet be effective in operation. It is, for example, important that a dryer or dehydrator be adapted to circulate ambient air heated to an elevated temperature to improve the moisture absorption capability of the air circulated through the dehydrator. The use of ambient air reduces the power requirements of a dehydrator and also reduces the temperature to which the food must be heated in order to provide sufficient moisture removal. Accordingly, it is desirable to provide for circulation of ambient air through the dehydrator apparatus with the flow being in substantially one direction over the food to be dehydrated to minimize recirculation so as to improve the rate of evaporation. It is also important to be able to provide sufficient air circulation and to raise the temperature of the air to a desired level for optimum moisture evaporation while at the same time minimizing the consumption of energy. Low energy consumption and quiet operation are both highly desired features in most home appliances including apparatus of the type represented by the present invention. However, prior art food dehydrator or dryer apparatus have not been particularly adapted for use as a typical kitchen appliance and are not particularly energy efficient.

A problem with some types of prior art dehydrating apparatus pertains to the arrangement whereby heated air is continually recirculated within an enclosure to provide the dehydrating function. The closed circulation type of apparatus is limited in its capability to absorb moisture because the air becomes saturated at a particular temperature and only by raising the temperature can more moisture be removed from the material being dehydrated.

In prior art dehydrator apparatus little effort has been made to improve the air flow over and around the food supporting trays or screens to maximize the moisture evaporation rate and at the same time minimize the air circulation power requirements and the energy consumed in heating the air to perform the drying function. The present invention is directed to improvements in apparatus for alleviating both of these deficiencies in prior art dehydrators.

SUMMARY OF THE INVENTION

The present invention provides for an improved dehydrator or the like which is particularly adapted for use in the typical home kitchen as an appliance which is suited for use in drying and dehydrating various foodstuffs and the like. The present invention provides an improvement in dehydrator apparatus of the type having a housing or support for one or more foraminous trays or screens which support food particles whereby heated air is circulated over and through the trays to evaporate moisture in the food.

In accordance with one aspect of the present invention there is provided a food dehydrator having a housing forming an enclosure in which is disposed a motor driven fan which circulates ambient air vertically upward over a heating element and through one or more vertically stacked trays having foraminous or perforated bottom walls forming a shelf. The housing forms a flow passage having inlet means formed generally at the lower end or bottom of the housing which inlet means are in the form of one or more openings arranged such that the inlet air is drawn in over a fan motor and is circulated by the fan vertically upwardly over a heating element and then through the stacked food supporting trays or screens. By circulating the inlet air over the fan motor the motor itself is maintained relatively cool and any heat rejected by the motor is utilized in warming the air to minimize the power requirements of the separate electrical heating element. Moreover, by conducting the inlet air initially into the housing closely adjacent to the fan recirculation of air propelled by the fan is minimized. The motor is advantageously disposed within the enclosure formed by the housing and may be relatively small and compact thereby minimizing the noise level of the apparatus and the energy requirements thereof.

In accordance with another aspect of the present invention there is provided a dehydrator apparatus having one or more tray members having unique openings or orifices formed in the food supporting shelf surfaces of the trays which provide for improved air flow characteristics of the dehydrator which characteristics have heretofore not been known. The food supporting trays are provided with openings or orifices which provide for air circulation through the apparatus in substantially one direction and which improve the velocity and distribution of air flow to absorb and carry away evaporated moisture more rapidly thereby minimizing the time required for drying foods and the total energy consumed by the dehydrator.

Still further in accordance with the present invention a plurality of vertically stackable food supporting trays for dehydrators and the like are provided with improved foraminous foods supporting shelf surfaces or screens having air flow openings formed by convergent orifices or flow passages which increase the velocity of air flow through the trays and substantially prevent reverse flow or recirculation of moisture laden air back through levels of supported foods which have already been dried. Accordingly, in applications for food or other material drying processes the unidirectional flow characteristics provided by the foraminous trays of the present invention improve the rate of drying and the total amount of dehydration that may be accomplished in a given time period.

The unique construction of the tray or screen of the present invention may be adapted to other uses wherein resistance to reverse flow or so called unidirectional flow is desired.

The present invention provides an improved dehydrator apparatus for foodstuffs and the like which is particularly suited for use as a home appliance but which includes features which may be adapted to other types of drying apparatus. In accordance with the present invention a compact, lightweight cylindrical housing supporting a motor driven fan is adapted to form a primary air flow channel or duct for directing heated ambient air through a series of vertically stacked food supporting trays having improved foraminous supporting surfaces or screens which enhance the air flow through the apparatus and improve the rate and amount of drying capability of the apparatus. The dehydrator of the present invention has several important advantages including those discussed hereinabove. The arrangement of the plural vertically stacked trays and the open construction of the apparatus provide for minimum drying time in a unit which is more compact than prior known dehydrators. Moreover, a smaller fan and fan drive motor may be used due to the total air flow and circulating force requirements being reduced through the use of ambient air which is preheated in the apparatus and the improved flow characteristics provided by the food support trays.

The above noted and other advantages will be further appreciated upon reading the detailed description which follows in conjunction with the drawings.

BRIEF DESCRIPTION OF THE DRAWINGS

FIG. 2 is a vertical elevation, in section, taken substantially along the line 2—2 of FIG. 1;

FIG. 3 is a plan view of one of the food supporting trays of the apparatus shown in FIG. 1;

FIG. 4 is a section view taken along the line 4—4 of FIG. 3;

FIG. 5 is a section view taken along the line 5—5 of FIG. 3;

DESCRIPTION OF THE PREFERRED EMBODIMENT

Figure 1:
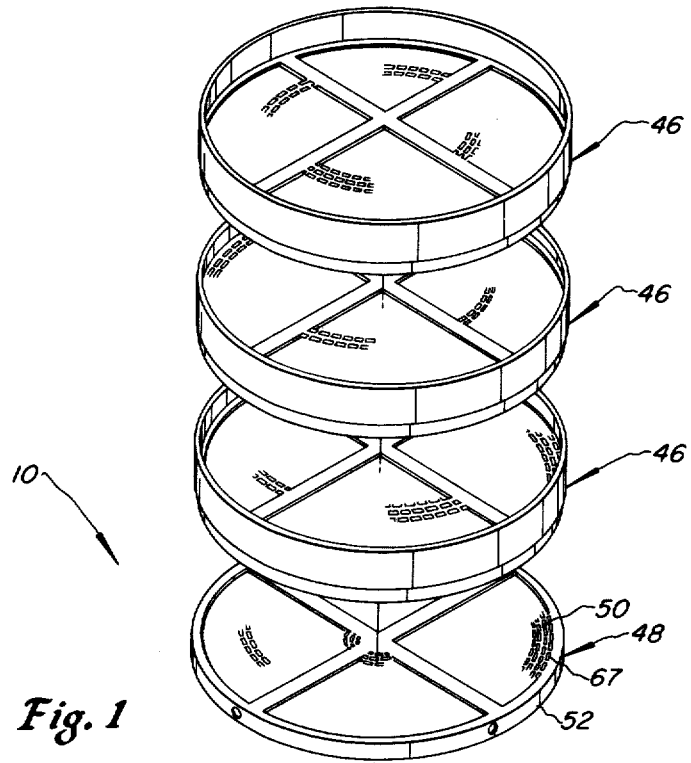
FIG. 1 is an exploded perspective view, partially sectioned, illustrating the dehydrator apparatus of the present invention.
Figure 1:
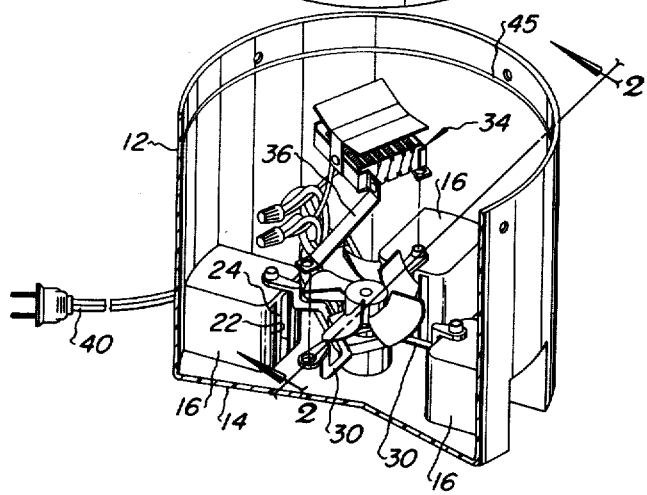

Referring to FIG. 1, there is illustrated an improved dehydrator apparatus in accordance with the present invention and generally designated by the numeral 10. The dehydrator 10 includes a generally cylindrical tubular housing 12 having a transverse base or bottom wall 14. The housing 12 includes four equally spaced and radially disposed recessed portions 16 which form supporting pedestals for a fan motor 18 as shown also in FIG. 2. The recessed portions 16 each form an air inlet channel 20 and have openings 22 formed in the innermost vertical wall of the recessed portions 16. One or more integrally formed vertical bars 24 are disposed across the openings 22, as shown by way of example in FIG. 1, to minimize the chance of objects being thrust through the openings 22 into the plane of rotation of a rotary fan 26.

The fan 26 is close coupled to the motor 18 and is rotatably driveable thereby to provide a generally vertically upward flow of ambient air drawn into the interior 28 of the housing through the plural openings 22. The arrangement of the fan 26 and the fan motor 18, with respect to the air inlet means characterized by the flow channels 20 and the openings 22, is an important aspect of the present invention. By positioning the air inlet openings 22 surrounding and generally adjacent to the motor 18 in the manner illustrated the inlet air to the fan 26 is drawn generally over the motor to absorb any heat generated by the motor and at the same time warming the air to increase the drying capability of the dehydrator apparatus 10. Moreover, the radially disposed air inlet flow channels 20 provided by the recessed portions 16 of the housing also reduces line of sight transmission of noise from the fan to the exterior of the housing making the apparatus 10 considerably more quiet in operation than some prior art apparatus. The motor is suitably mounted within the interior 28 of the housing 12 by generally radially projecting mounting arms 30 which are suitably fixed to the top walls of the recessed portions 16 by suitable fastener means 32.

The dehydrator apparatus 10 further includes an electrical resistance type heating element, generally designated by the numeral 34, which is adapted to be mounted directly above the fan 26 on a pair of generally downwardly depending support legs 36 which are aligned with the mounting holes for two of the motor support arms 30, as shown in FIGS. 1 and 2. The heating element 34 includes a grid of resistance type heating coils suitably mounted on a generally rectangular frame to allow air to flow vertically upward both around and through the element itself. The element 34 is provided with a shield 38 suitably mounted directly above the heating grid to provide for some turbulation of air flowing through the element and also to prevent substances from falling down into the interior 28 onto the surface of the heating grid of the element. One suitable type of heating element which may be used with the apparatus 10 is of a type manufactured by the Hartford Element Company, Newport, New Hampshire and identified as model number 8569, although other types and sizes of heating elements may be used to suit particular requirements. The motor 18 is also preferably a small induction type operating on 120 volt 60 cycle AC power and driving a fan such as the fan 26 at a speed of 1750 revolutions per minute to supply a nominal flow rate of 66 CFM of air. One conventional motor preferred for the apparatus 10 is manufactured by Gould, Inc., Watertown, New York, as their model number 2341. The motor 18 and heating element 34 are preferably directly connected in parallel to a source of electrical power through a cord and plug assembly designated by the numeral 40 in FIG. 1. One of the leads to the heating element 34 may be provided with a thermal switch 42, shown in FIG. 2, disposed generally in the flow path of the air from the fan 26 to interrupt the supply of electrical energy to the element 34 when the temperature in the interior 28 reaches a predetermined maximum level. In this way, should the flow of air through the interior of the housing 12 be substantially impaired, the chances of overheating of the apparatus 10 will be minimized. One type of thermal switch preferred for use with the present invention is manufactured by 3M Company, Minneapolis, Minnesota.

Referring further to FIGS. 1 and 2, the housing 12 includes an upper annular ledge 44 adapted to support one or more circular screen elements or trays generally designated by the numeral 46 and adapted to be vertically stacked in nested relationship with respect to each other. The cylindrical inner wall of the housing 12 is provided with a radially inwardly projecting annular ridge 45 spaced from the ledge 44 and providing means for locating a circular screen or guard member 48 having a foraminous shelf 50 and a depending annular rim portion 52. The member 48 may be removably mounted within the interior of the housing 12 as illustrated in FIG. 2 and is preferably somewhat permanently fixed therein by suitable fasteners such as rivets 54. The diameter of the rim portion 52 of the member 48 is only slightly less than the diameter of the inner wall of the housing 12 whereby the member may be suitably mounted within the housing as shown.

Referring also to FIGS. 3 and 5 the vertically stackable trays 46 are identical in construction and are provided with a circumferential depending rim 56 having an outer diameter approximately the same as the outer diameter of the rim 52 so that one of the trays 46 may be mounted on top of the housing 12 in nested relationship therein. Each of the trays 46 is also provided with an axially upwardly projecting circumferential flange portion 58 having an outer diameter greater than the outer diameter of the rim 56 to provide an annular shoulder 60 as shown also in FIG. 5. The diameter of the inner wall 62 of the flange 58 is proportioned to be only slightly greater than the outer diameter of the rim 56 whereby the trays 46 may be securely stacked one on top of the other to provide a plurality of food drying levels for the dehydrator 10.

The trays 46 are each provided with a foraminous circular food supporting surface or shelf 64 which, as shown in FIGS. 3, 4 and 5, is provided with a plurality of radially spaced apart annular rows of openings or orifices generally designated by the numeral 66. The orifices 66 are characterized as comprising somewhat rectangular shaped flow passages provided with generally convergent or sloping side walls 68 and 70, as shown by way of example in the section views of FIGS. 4 and 5. Accordingly, the orifices 66 in the shelf 64 form flow passages having somewhat the shape of a truncated pyramid. As illustrated in FIG. 3, the orifices 66 are arranged side by side in annular rows occupying substantially the entire surface of the shelf 64 of the tray 46 except for the solid radially projecting spoke portions 72. The spokes 72 provide some rigidity for the shelf 64 of the tray 46. Moreover, the trays 46 are preferably made of injection molded thermoplastic suitable for use with foodstuffs and the like and the spokes 72 provide suitable gating in the mold to provide adequate flow of material during the molding process. The member 48 is also provided with convergent flow passages or orifices 67 having the same configuration as the orifices 66. For purposes of illustration, the entire surface of the shelf 64 as well as the base 50 for the member 48 has not been illustrated to show all of the openings 66 and similar openings 67 in the tray 48. Suffice it to say that substantially the entire area of the shelf portions 64 and 50, respectively, are provided with the orifices 66 and 67 in the general pattern illustrated.

The provision of the convergent flow passages or orifices 66 and 67 having the sloping side walls 68 and 70, shown by way of example in FIGS. 4 and 5, provides for unexpectedly improved air flow characteristics for the dehydrator apparatus 10. In accordance with the present invention the provision of the convergent orifices 66 and 67, in the respective members 46 and 48, tend to accelerate the air flow through the food drying spaces between each tray to increase the turbulence and mixing of the flow but also to prevent flow reversal or in a direction generally opposite to the arrow 74 in FIGS. 4 and 5. In other words, air flow in the direction of the arrows 74 is subject to less resistance than flow in the opposite direction. In this way there is no tendency for air which has already absorbed moisture in the dehydration of the foodstuffs lying on the shelf portions to recirculate downwardly and retard the dehydration process. Moreover, the acceleration of air flow through the convergent orifices 66 and 67 also increases the turbulence and mixing within the spaces between each tray to further enhance the dehydration process.

Although the shape and configuration of the orifices 66 may be varied it has been determined that in accordance with the present invention that a dehydrator apparatus having trays 46 approximately 11 to 12 inches in diameter are preferably provided with orifices of a generally rectangular or annular segment shape having a width dimension measured in the plane of the bottom surface 63 or inlet side of 3/32 inch and a length dimension of 3/16 inch with a thickness of the shelf 64 of 1/16 inch. The webbing or transverse wall thickness between each orifice 66 on the bottom surface 63 is approximately 1/32 inch. Moreover, the angle of convergence for the side walls 68 and 70, designated respectively by the letters a and b in FIGS. 4 and 5, are preferably approximately 15 degrees in one embodiment of the present invention. This leaves an outlet opening measuring approximately ⅛ inch × 1/16 inch in the plane of the top surface 65 of the shelf 64.

In operation, the dehydrator apparatus 10 is conveniently usable in a suitable place such as on a kitchen cabinet or counter top. Although any number of the trays 46 may be used in a food dehydration operation the motor and heating element of the type and size described herein limits the number of trays 46 to an optimum of five thereby providing five drying levels for the most efficient operation of the apparatus. Any number of trays up to the maximum preferred number indicated may, of course, be used. Food particles are preferably laid uniformly on the surfaces of the shelf portions 64 of the respective trays 46 and the trays are nested vertically one on top of the other. The cord 40 is then plugged into a suitable receptacle to commence operation of the fan to draw fresh ambient air in through the openings 22 and over the exterior of the motor 18. The air flow is then impelled upward around the heating element 34 and turbulated somewhat by the deflector 38. As the air flows through the orifices 67 it is straightened somewhat from the swirling flow pattern induced by the fan 26. The air flow stream then progresses through the respective shelves 64 by way of the orifices 66 and at each level the flow is accelerated but substantially prevented from flowing in the direction opposite to the arrow 74 in FIGS. 4 and 5. The air flow exits through the top tray 46 back to atmosphere and a virtually infinite source of fresh air is continually drawn in through the inlet flow channels 20.

The dehydrator apparatus 10 provides a versatile and useful appliance which is compact, quiet, requires minimal maintenance and is particularly attractive due to its low energy consumption. The moisture evaporation capability and the overall efficiency of the apparatus 10 is improved as compared with prior art dehydrators. Moreover, the provision of the food supporting trays 46 and the member 48 with the improved screenlike shelf portions particularly enhances the performance of the apparatus. The unidirectional flow characteristics provided by the orifices 66 and 67 reduces the drying time by eliminating recirculation of air and by increasing the flow velocity and mixing to further enhance the dehydration process while requiring a motor and fan of minimum size.

Accordingly, the dehydrator apparatus disclosed and claimed herein enjoys all of the advantages of the apparatus described in my prior co-pending application referred to above and further benefits from the improvements in an unexpected and desirable way. The housing 12 may be made of a suitable thermoplastic similar to the trays 46 and the member 48. The vertically stacked trays 46, which may be merely lifted off of each other when removed from the apparatus, may be interchanged with each other during the drying process which is normally not required except in cases where more than the optimum number of trays is being used.

Figure 6:
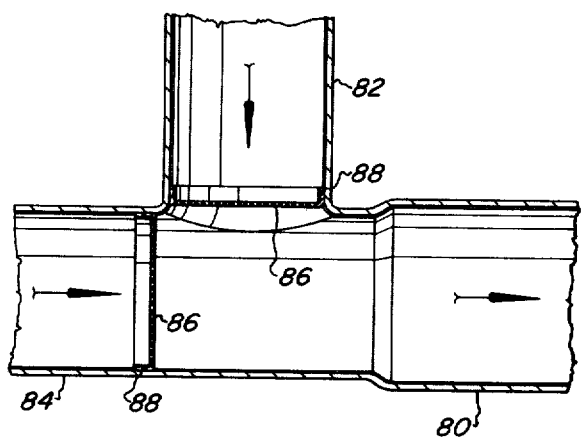
FIG. 6 is a section view illustrating another use of a tray or screen in accordance with the present invention.

In accordance with the present invention, it is further contemplated that the unique construction of member 48 and the trays 46 may be adapted to screens or grilles for other applications wherein directional control over the flow of a fluid is desired. For example, in air conditioning and heating systems, there are arrangements where it is desired to have air flowing to or from a common duct from more than one source or to plural outlets, respectively, and wherein reverse flow in the system is unwanted. Referring to FIG. 6 of the drawings there is illustrated, by way of example, in somewhat schematic form a portion of an air flow duct 80 which is supplied with air from two separate supply branch ducts 82 and 84. The mouth or outlet portions of each of the ducts 82 and 84 are provided with cylindrical grilles or screens 86 having an overall configuration similar to the member 48 illustrated in FIGS. 1 and 2. The screens 86 are provided with annular rim portions 88 similar to the rim portion 52 of the member 48.

Figure 7:
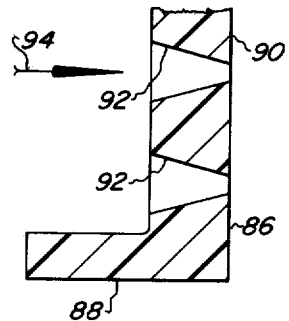
FIG. 7 is a detail section view of the screen shown in FIG. 6 on a larger scale.

Referring also to FIG. 7, a portion of one of the screens 86 is shown in longitudinal section in a view similar to the view of FIG. 5. The screen 86 comprises a foraminous wall 90 constructed similarly to the shelf portions 64 of the trays 46 and includes a plurality of converging orifices 92 similar to the orifices 66 and 67 of the embodiment of the present invention illustrated in FIGS. 1 through 5. The converging orifices 92 may be constructed in the same manner as the orifices 66 and 67, that is, in annular rows of generally rectangular or annular sector shaped openings and formed by flow passages of somewhat truncated pyramidal shape. The intended direction of air flow through the duct 80 is indicated by the arrows in FIG. 6 and the arrow 94 in FIG. 7. In the application of the screens 86 to the duct system 80, 82 and 84, if for any reason the flow of air through, for example, the duct 82 is reduced or shut off the screen 86 will present a resistance to flow into the duct 82 in the reverse direction from either the duct 80 or 84.

Those skilled in the art will appreciate that the configuration of the orifices 92 may be altered as well as the overall shape of the screen 86 without departing from the scope of the present invention. Although the particular configuration of the orifices in a screen or food supporting tray as illustrated in the drawings has been shown to perform well, it is contemplated that the orifices may be circular, triangular or of some other cross sectional shape. The important feature is that the flow passage forming the orifice is generally convergent in the intended direction of flow so that the cross sectional flow area of the orifice or flow passage at its outlet is less than the cross sectional flow area at its inlet. The structural shape and material of such a flow control means, as contemplated by the present invention, may take various forms as will be appreciated by those skilled in the art. However, a preferred construction for a screen such as the screens 86 would be molded plastic, cast metal or formed metal.

Those skilled in the art will further appreciate that various modifications may be made to the present invention while utilizing the principles thereof and falling within the scope and spirit of the invention as expressed in the appended claims.

What I claim is:

1. Dehydrator apparatus for drying food comprising:
  a housing including a vertical sidewall portion and a transverse base wall joined to said sidewall portion and forming an enclosure;
  air intake means in said housing comprising a plurality of spaced apart recesses formed by respective wall portions of said housing projecting inwardly from said sidewall portion adjacent said base wall and forming air inlet flow channels into said housing through openings in respective walls of said recesses;
  at least one food supporting tray member disposed across an open top part of said housing, said tray member having a foraminous food supporting portion forming a generally flat shelf;
  a fan mounted in said housing generally above said openings and disposed for inducting a flow of air into said housing through said air intake means and then through said shelf; and
  a motor mounted in said housing below and drivably connected to said fan, said motor being mounted adjacent said openings in said recesses whereby air is drawn through said channels into said housing by said fan and flows generally over said motor before flowing through said shelf.

2. The invention set forth in claim 1 together with:
  an electrical heating element mounted in the flow path of said air flow through said housing.

3. The invention set forth in claim 2 wherein:
  said heating element includes a shield disposed between said heating element and said tray member.

4. The invention set forth in claim 1 wherein:

said wall portions forming said recesses are adapted to support said motor and said heating element.

5. The invention set forth in claim 1 wherein:

said shelf includes a plurality of orifices defined by wall means converging in the direction of air flow propelled by said fan, said orifices presenting a resistance to air flow in the opposite direction greater than the resistance to air flow in the direction propelled by said fan.

6. The invention set forth in claim 5 wherein:

said tray member is generally circular and said orifices are formed as annular concentric rows of openings in said shelf.

7. The invention set forth in claim 5 wherein:

said apparatus includes a plurality of tray members vertically stackable one on top of another to provide a plurality of spaced apart food drying levels, each of said tray members being provided with orifices in said shelf adapted to provide for substantially vertical unidirectional air flow from the space above one drying level to the space above the next drying level.

8. The invention set forth in claim 7 wherein:

said tray members are circular and are provided with circular peripheral axially extending rim and flange portions, said rim portions engageable in nesting relationship within the flange of the adjacent tray member.

9. The invention set forth in claim 5 wherein:

said orifices are formed by substantially flat sided converging wall portions forming a pyramidal shaped flow passage defining an outlet opening of smaller cross sectional flow area than an inlet opening to said flow passage.

10. The invention set forth in claim 9 wherein:

said converging wall portions form an angle with respect to the longitudinal axis of said flow passage of at least 15 degrees.

11. Dehydrator apparatus for drying food, comprising:

housing means forming an enclosure having air intake means and air discharge means;

fan means for directing a flow of air through said housing means; and food supporting tray means adapted to be supported by said housing and comprising a foraminous shelf disposed in the flow path of air passing through said housing means, said shelf including means providing a food supporting surface, a plurality of openings in said shelf forming a plurality of flow passages defined by wall means converging toward and intersecting said means forming said food supporting surface and in the direction of air flow propelled by said fan means, said openings in said shelf providing a greater resistance to air flow in a direction opposite to the direction of air flow provided by said fan means whereby recirculation of drying air through said dehydrator is minimized.

12. Dehydrator apparatus for drying food, comprising:

housing means forming an enclosure having air intake means and air discharge means;

fan means for directing a flow of air through said housing means;

a plurality of food supporting trays supported on said housing vertically stacked one on top of another to provide a plurality of spaced apart drying levels disposed in the flow path of air passing through said housing means, each of said trays being provided with openings therein of a configuration which provide for flow of air generally in one direction through the spaces between said plurality of drying levels, said openings in said trays being formed to provide a greater resistance to air flow in a direction opposite to said one direction whereby recirculation of drying air between said drying levels is minimized.

13. The invention set forth in claim 12 wherein:

said trays are circular and are provided with circular peripheral axially extending rim and flange portions, said rim portions engageable in nesting relationship within the flange portion of the adjacent tray.

14. The invention set forth in claim 12 wherein:

said openings are formed by substantially flat sided converging wall portions forming a pyramidal shaped flow passage defining an outlet opening of smaller cross sectional flow area than an inlet opening to said flow passage.

15. The invention set forth in claim 14 wherein:

said converging wall portions form an angle with respect to the longitudinal axis of said flow passage of at least 15 degrees.

16. Dehydrator apparatus for drying food comprising:

a generally cylindrical vertically disposed tubular housing forming an enclosure with air intake means formed at the bottom of said housing;

a fan mounted in said housing and disposed for inducting a flow of air into said housing through said air intake means;

a motor mounted in said housing and drivably connected to said fan;

a foraminous shelf disposed across the interior of said housing above said fan; and a plurality of food supporting trays vertically stackable one on top of another on said housing above said shelf to provide a plurality of spaced apart food drying levels, said shelf and said plurality of trays each being provided with a plurality of orifices defined by wall means converging generally in the direction of air flow propelled by said fan, said orifices in said shelf and said trays providing a resistance to air flow in a direction opposite to the direction of flow propelled by said fan greater than the resistance to flow in the direction which air is being propelled by said fan.

17. A cylindrical tray for supporting material such as food particles and the like for dehydration, said tray comprising a member adapted to be positioned in the path of a flow of air through a duct or the like, said member being formed with peripheral rim and flange portions extending axially in opposite directions from a foraminous wall, said wall including a plurality of flow passages therein extending from one surface of said wall to an opposed surface of said wall, said passages converging from said one surface to intersection with said opposed surface of said wall, said passages being formed by substantially flat sided converging portions of said wall forming pyramidal shaped flow passages defining outlet openings in the plane of said opposed surface of smaller cross-sectional flow area than the inlet openings of said passages formed in the plane of said other surface, said converging wall portions forming an angle with respect to the longitudinal axis of said passages of at least 15 degrees, said member being arranged with respect to the flow of air through said duct whereby the normal direction of flow is in the direction of convergency of said passages whereby the resistance to air flow through said duct due to said member in the direction of convergency of said passages is less than the resistance to air flow in the opposite direction.

* * * * *